(12) United States Patent
Van Den Bergh

(10) Patent No.: US 12,391,013 B2
(45) Date of Patent: Aug. 19, 2025

(54) METHOD FOR PRINTING AN OPTICAL COMPONENT UTILIZING LAYER COMPENSATION

(71) Applicant: META PLATFORMS TECHNOLOGIES, LLC, Menlo Park, CA (US)

(72) Inventor: John-John Van Den Bergh, Eindhoven (NL)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 380 days.

(21) Appl. No.: 17/912,117

(22) PCT Filed: Apr. 15, 2021

(86) PCT No.: PCT/EP2021/059788
§ 371 (c)(1),
(2) Date: Sep. 16, 2022

(87) PCT Pub. No.: WO2021/209551
PCT Pub. Date: Oct. 21, 2021

(65) Prior Publication Data
US 2023/0135074 A1    May 4, 2023

(30) Foreign Application Priority Data

Apr. 16, 2020    (EP) .................................... 20169921

(51) Int. Cl.
*B29D 11/00*    (2006.01)
*C09D 11/08*    (2006.01)
*B29L 11/00*    (2006.01)

(52) U.S. Cl.
CPC ........ *B29D 11/00009* (2013.01); *C09D 11/08* (2013.01); *B29L 2011/0016* (2013.01)

(58) Field of Classification Search
CPC ........ B29D 11/00009; B29D 11/00432; C09D 11/08; B29L 2011/0016; B29C 64/393;
(Continued)

(56) References Cited

U.S. PATENT DOCUMENTS

2004/0159978 A1    8/2004    Nielsen et al.
2016/0101573 A1    4/2016    Quere et al.
(Continued)

FOREIGN PATENT DOCUMENTS

CN    109049674 A    12/2018
EP    2962860 A1    1/2016
(Continued)

OTHER PUBLICATIONS

International Search Report and Written Opinion dated Jun. 28, 2021, for International Application PCT/EP2021/059788.
(Continued)

*Primary Examiner* — Zhipeng Wang

(57) ABSTRACT

The present invention refers to a Method for printing a three-dimensional optical structure (1), wherein the three-dimensional optical structure (1) is built up from layers (L) of printing ink deposited through targeted placement of droplets of printing ink at least partially side by side in consecutive printing steps, wherein in order to at least partially compensate for deviations of a thickness from a nominal thickness of at least one layer (2), possible deviations are determined prior to printing said layer (2) and depositing the printing ink is controlled dependent on the determined possible deviations during printing of said layer (2).

20 Claims, 2 Drawing Sheets

(58) Field of Classification Search
CPC ....... B29C 64/112; B33Y 80/00; B33Y 10/00; B33Y 50/02
See application file for complete search history.

(56) References Cited

U.S. PATENT DOCUMENTS

| | | | |
|---|---|---|---|
| 2017/0173870 A1 | 6/2017 | Condello et al. | |
| 2017/0368752 A1 | 12/2017 | Shelhart et al. | |
| 2018/0281290 A1 | 10/2018 | Yamazaki | |
| 2019/0255779 A1* | 8/2019 | Blomaard | B29C 64/112 |
| 2021/0094237 A1* | 4/2021 | Weber | B29C 64/112 |

FOREIGN PATENT DOCUMENTS

| | | |
|---|---|---|
| JP | 2004230895 A | 8/2004 |
| JP | 2016087831 A | 5/2016 |
| JP | 2016527099 A | 9/2016 |
| JP | 2018164990 A | 10/2018 |
| KR | 20160018574 A | 2/2016 |

OTHER PUBLICATIONS

European Search Report dated Sep. 17, 2020, for European Application EP20169921.
International Preliminary Report on Patentability dated Jul. 11, 2022, for International Application PCT/EP2021/059788.
Office Action mailed Jan. 7, 2025 for Japanese Patent Application No. 2022-559446, filed on Apr. 15, 2021, 11 pages.
Office Action mailed Feb. 24, 2025 for Chinese Application No. 202180021250.1, filed Apr. 15, 2021, and English machine translation thereof (13 pages).

* cited by examiner

METHOD FOR PRINTING AN OPTICAL COMPONENT UTILIZING LAYER COMPENSATION

BACKGROUND

The present invention relates to a method for printing a three-dimensional optical structure, in particular an ophthalmic lens, wherein the three-dimensional optical structure is built up from layers of printing ink deposited through targeted placement of droplets of printing ink at least partially side by side in consecutive printing steps.

Printing three-dimensional optical structures such as ophthalmic lenses is known from the prior art. In three-dimensional printing, a three-dimensional structure is built up from layers of printing ink. The printing data that encode the shape and size of these layers are obtained from a virtual slicing of the three-dimensional structure to be printed into two-dimensional slices. Conventionally, the slices comprise a top surface and a bottom surface that are parallel to each other and a peripheral edge of a defined and usually fixed height. For example, the slices are cylindrical and of varying diameter. For each slice, a layer is deposited through a targeted placement of droplets of printing ink at least partially side by side by the ejection nozzles of a print head. The layers are printed at least partially above each other to form the intended three-dimensional structure.

Due to the surface tension of the deposited printing ink, the actual shape of a printed layer differs from the intended shape of the layer, namely the shape of the corresponding slice. For example, superelevations occur at the edges of the deposited layers due the surface tension of the printing ink. Even though these deviations may be small for a single deposited layer, they do add up and result in a printed structure whose shape differs from the intended shape. Due to the high accuracy required for optical applications, the associated error is particularly detrimental for printed optical structures, in particular ophthalmic lenses.

SUMMARY

Hence, it is a purpose of the present invention to provide a method for printing three-dimensional optical components, in particular ophthalmic lenses, with an increased accuracy as compared to methods according to the state of the art.

According to the present invention, this object is achieved by a method for printing a three-dimensional optical structure, in particular an ophthalmic lens, wherein the three-dimensional optical structure is built up from layers of printing ink deposited through targeted placement of droplets of printing ink at least partially side by side in consecutive printing steps, wherein in order to at least partially compensate for deviations of a thickness from a nominal thickness of at least one layer, possible deviations are determined prior to printing said layer and depositing the printing ink is controlled dependent on the determined possible deviations during printing of said layer.

Depositing the printing ink dependent on the determined possible deviations allows for printing a layer such, that effects affecting the layers geometry lead to a layer with the desired shape. Thus possible deviations of the geometry of a layer are already avoided when printing the layer. The need for, e.g. complex creation of compensation layers to compensate for deviations is eliminated. It is thinkable, that the method is carried out for two or more layers. It is also thinkable, that the method is applied to a plurality of layers arranged directly one after the other. It is also thinkable, that the method is applied to a plurality of layers arranged at a distance from each other.

Optical structures in the sense of the present invention comprise lenses, Lenses may comprise ophthalmic lenses. Ophthalmic lenses comprise concave, convex, biconcave, biconvex and meniscus lenses. Ophthalmic lenses in the sense of the present invention also comprise multifocal lenses as well as gradient-index lenses. Ophthalmic lenses comprise in particular spectacle lenses or other lenses that are not inserted into the eye.

In the sense of the present invention, printing of an optical component comprises building up the component from layers of printing ink. These are obtained through a targeted placement of droplets of printing ink at least partially side by side. The droplets of printing ink are ejected from the nozzles of a print head, typically towards a substrate. Droplets of layers constituting the second and following layers are at least partly ejected towards the previously deposited layer, such that the three-dimensional structure is built up layer by layer.

The printing ink preferably comprises a translucent or transparent component. Preferably, the printing ink comprises at least one photo-polymerizable component. The at least one photo-polymerizable component is preferably a monomer that polymerizes upon exposure to radiation, e.g. ultra-violet (UV) light. The deposited droplets are preferably pin cured, i.e. partially cured, after deposition. Preferably, the viscosity of at least one component of the printing ink is increased. Pin curing is preferably carried out after deposition of the respective droplet or after deposition of an entire or only part of a layer. Alternatively, pin curing is carried out at certain intervals, e.g. after printing of every second layer.

According to a preferred embodiment of the present invention, during printing said layer, at least on a part of said layer, the droplets are placed according to a dither pattern, such, that the number of droplets placed on said part is reduced, preferably the number of droplets is reduced by leaving blank spaces when placing the droplets, wherein no droplets are placed on said blank spaces. In the sense of the present invention, a dither pattern is a two-dimensional template that contains the location of the blank spaces in said part of said layer. A dither pattern may also include gray values. In this case, a gray value could be linked to a printing parameter such as droplet size, amount of printing ink per droplet, or the like. Including the blank spaces in the part of the layer reduces the number of droplets printed, which subsequently reduces the volume of the part of the layer. The thickness of the part of the layer is reduced therewith. It is thinkable, that the dither pattern contains a homogenous density of the blank spaces, i. e. homogeneously distributed blank spaces. It is also thinkable, that the dither pattern contains an inhomogeneous density of the blank spaces, i. e. inhomogeneously distributed blank spaces so that there are more blank spaces are arranged in certain regions of the part of the layer than in other regions of the part of the layer. It is herewith possible to very accurately adjust the compensation of the deviations.

According to a preferred embodiment of the present invention, said blank spaces are distributed over the entire layer if a diameter of said layer is below a minimum diameter, wherein the minimum diameter is preferably 5 mm. If the diameter of a layer is below a certain minimum diameter, thickness excesses due to contracting effects of the edges of the layer merge and lead to an overall oversize of layer thickness. This can be reduced hereby. It is thinkable, that the dither pattern contains a higher density of blank spaces near to the center of the layer than at die edges. If the layer is not printed in a circle, the diameter in the sense of the present invention means the smallest diameter of the layer.

According to a preferred embodiment of the present invention, said part of said layer is arranged parallel to a circumference of said layer, wherein said part of said layer is preferably arranged a distance away from the circumference, wherein the distance is preferably between 0.1 and 2 mm, or wherein said part of said layer preferably adjoins the circumference. This preferred embodiment enables compensating for so called printed-layer-edge-effects, where the thickness of a layer exceeds the nominal thickness near the edges by surface effects of the printing ink. Preferably, said part of said layer is formed as a loop or ring, wherein the loop or the ring preferably has a width, wherein the width is between 0.1 and 5 mm, more preferably between 0.2 and 0.7 mm, most preferably 0.5 mm. With this, printed-layer-edge-effects can almost completely be compensated.

According to a preferred embodiment of the present invention, said blank spaces are arranged randomized or at least partially randomized on said part of said layer. In the sense of the present invention, arranged randomized means that the blank spaces are not arranged with repeated distances to each other. In other words, the distances between the blank spaces are randomized, so that the blank spaces do not result in an optically effective grating. A positive effect of this is that diffraction effects are avoided. In the sense of the present invention, arranged at least partially randomized means that the blank spaces are not arranged with repeated distances to each other on a pattern-section of said part of said layer. It is thinkable that said part of said layer comprises a plurality of pattern-sections with identical or non-identical arrangements of blanks.

According to a preferred embodiment of the present invention, during printing said layer, at least on a further part of said layer, the volume of each droplet is reduced. This can for example be done by reducing the amount of printing ink used for each droplet. Reducing the amount of printing ink reduces the thickness of the layer. It is therewith possible to compensate for thickness excesses. It is thinkable that the reduction of the volume of the droplets in the further part follows a volume pattern. It is thinkable, that the volume pattern contains a homogenous distribution of volumes, i. e. the volume reduction is constant in the whole further part. It is also thinkable, that the volume pattern contains an inhomogeneous distribution of volumes. It is herewith possible to very accurately adjust the compensation of the deviations.

According to a preferred embodiment of the present invention, said further part of said layer covers the entire layer if a diameter of said layer is below a further minimum diameter, wherein the further minimum diameter is preferably 5 mm. If the diameter of a layer is below a certain minimum diameter, thickness excesses due to contracting effects of the edges of the layer merge and lead to an overall oversize of layer thickness. This can be reduced hereby. It is thinkable, that the volume pattern contains lower volumes near to the center of the layer than at the edges.

According to a preferred embodiment of the present invention, said further part of said layer is arranged parallel to a circumference of said layer, wherein said further part of said layer is preferably arranged a further distance away from the circumference, wherein the further distance is preferably between 0.1 and 2 mm, or wherein said part of said layer preferably adjoins the circumference. This preferred embodiment enables compensating for printed-layer-edge-effects. Preferably, said further part of said layer is formed as a loop or ring, wherein the loop or the ring preferably has a further width, wherein the further width is between 0.1 and 5 mm, more preferably between 0.2 and 0.7 mm, most preferably 0.5 mm. With this, printed-layer-edge-effects can almost completely be compensated.

According to a preferred embodiment of the present invention, in order to at least partially compensate for further deviations of a further thickness from a further nominal thickness of a further layer printed in a preceding printing step, depositing the printing ink is controlled dependent on said further deviations during printing of said layer. This enables to compensate for so-called printed-layer-thickness-inhomogeneity. The droplets of a layer will form a thin-film. For this, the droplets need time to merge. This time is called the settling-time. The longer the settling-time, the more homogeneous the printed layer will be. The settling-time depends on the ink and surface properties. A further impact on the Printed-layer-thickness-inhomogeneity is due to drop volume variations or drop misplacements while printing. Printed-layer-thickness-inhomogeneity can be in the order of 0 to 10% of a nominal layer thickness.

According to a preferred embodiment of the present invention, in order to at least partially compensate for said further deviation, during printing said layer, at least on a second further part of said layer, the droplets are placed according to a further dither pattern, such, that the number of droplets placed on said second further part is reduced, wherein the second further part is arranged above the further deviation, preferably the number of droplets is reduced by leaving further blank spaces when placing the droplets, wherein no droplets are placed on said further blank spaces. The thickness of the second further part of the layer is locally reduced therewith. The further dither pattern contains an inhomogeneous density of the further blank spaces, i. e. inhomogeneously distributed further blank spaces so that there are more further blank spaces are arranged in certain regions of the second further part of the layer than in other regions of the second further part of the layer. It is herewith possible to very accurately adjust the compensation of the further deviations.

According to a preferred embodiment of the present invention, said further blank spaces are arranged randomized or at least partially randomized on said second further part of said layer. The distances between the further blank spaces are randomized, so that the further blank spaces do not result in an optically effective grating. A positive effect of this is that diffraction effects are avoided.

According to a preferred embodiment of the present invention, during printing said layer, at least on a third further part of said layer, the volume of each droplet is reduced. This can for example be done by reducing the amount of printing ink used for each droplet. Reducing the amount of printing ink reduces the thickness of the layer. It is therewith possible to compensate for thickness excesses. The reduction of the volume of the droplets in the third further part follows a volume pattern that contains an inhomogeneous distribution of volumes. The distribution of volumes follows the thickness excesses of the further layer such, that these are compensated. It is herewith possible to very accurately adjust the compensation of the further deviations.

According to a preferred embodiment of the present invention, the further deviations are determined by measuring the shape and/or volume of a surface of the further layer, particularly by confocal scanning. This enables mapping thickness excesses very accurately and with this effectively compensating for the further deviations.

According to a preferred embodiment of the present invention, said further deviations comprise deviations of thicknesses from further nominal thicknesses of all layers printed in preceding printing steps. It is therewith possible to compensate for a sum of further deviations during printing of one or only a few layers. This is advantageous, since parts of the further deviations can already be averaged out by summing up the further deviations and thus no longer have to be taken into account.

According to a preferred embodiment of the present invention, the deviations and/or the further deviations are determined by simulating a contraction of the printed layers. It has surprisingly been found, that the effects of contraction of the printed layers is well reproducible and can be calculated using the physical properties of a thin-film fluid layer. The corresponding simulation provides an excellent basis for the compensation of deviations and/or further deviations.

According to a preferred embodiment of the present invention, the deviations and/or the further deviations of all layers to be printed are determined before printing using a simulation, wherein the deviations and/or further deviations are compensated during printing one or more layers. According to a preferred embodiment of the present invention, the deviations and/or the further deviations of all layers to be printed are determined before printing using a simulation, wherein the deviations and/or further deviations are compensated during printing one or more last layers. Parts of the deviations and/or the further deviations can already be averaged out by summing up the deviations and/or further deviations and thus no longer have to be taken into account. A corresponding simulation provides an excellent basis for the compensation of deviations and/or further deviations during printing the last curving layers.

DETAILED DESCRIPTION

Figure 1:
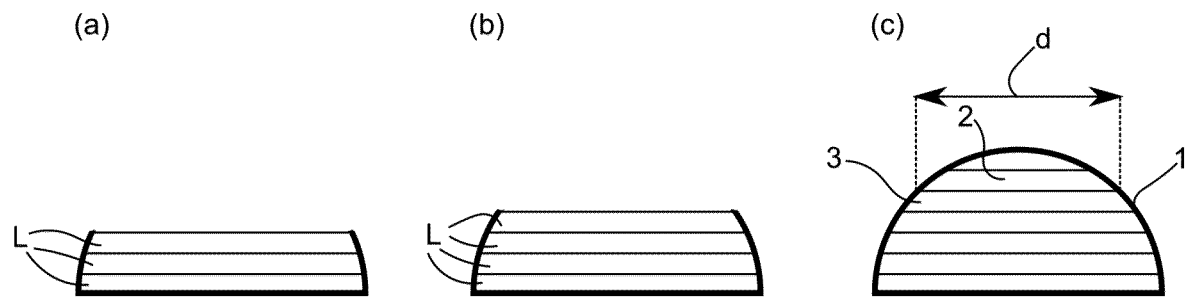
FIG. 1 schematically illustrates a printing method according to an exemplary embodiment of the present invention.

The present invention will be described with respect to particular embodiments and with target to certain drawings but the invention is not limited thereto but only by the claims. The drawings described are only schematic and are non-limiting. In the drawings, the size of some of the elements may be exaggerated and for illustrative purposes may not be drawn to scale.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a printing method according to an exemplary embodiment of the present invention is schematically illustrated. The three dimensional optical component 1 is printed by building up a number of layers L. From subFIGS. 1(a)-(c) it is apparent, how the optical component 1 is constructed by consecutive steps of layer printing. For printing each layer L, droplets of printing ink are ejected from the nozzles of a print head (not shown). The droplets are targeted placed at least partially side by side such, that the droplets merge forming a thin film. Due to surface effects of the thin film, the layers L are contracted at the edges, leading to excesses of the thickness of the layer L (see FIG. 2). If the diameter d of the layer L is below a certain limit, typically below 5 mm, the excesses at the edges of the layer L merge and lead to an increase of thickness in the total layer L. These excesses in thickness are quite small but, however, sum up over a multitude of layers L and lead to an unwanted geometry of the optical component 1 and with this to optical distortions.

SubFIG. 1 (c) shows the optical component 1 comprising a number of slices, each consisting of one layer printed by placing droplets of printing ink such, that the droplets merge to a thin film. To maintain an optimal geometry of the optical component 1, the dimensions, i. e. thickness and lateral dimensions, such as diameter d, of each slice are calculated. Printing the layers, the calculated dimensions have to be matched. To match the calculated thickness, i.e. a nominal thickness, possible deviations of thickness of a layer 2 are determined by a calculation. During printing of the layer 2, depositing the printing ink is controlled such, that the possible deviations are compensated and the printed thickness matches the nominal thickness. To achieve this, the droplets are placed according to a dither pattern (see FIG. 3). A dither pattern is a two-dimensional template that contains the location of blank spaces, where no droplets are placed. Leaving out droplets at the blank spaces locally reduces the printed volume and therewith the thickness of the layer 2. To locally compensate for larger excesses of thickness, the dither pattern locally schedules more blank spaces, i.e. the density of blank spaces is higher. To locally compensate for lower excesses of thickness, the dither pattern locally schedules less blank spaces, i.e. the density of blank spaces is lower. To avoid diffraction, the positions of the blank spaces are randomized in a certain range. Therewith it is provided, that the blank spaces do not act as an optical grating.

In addition to using the dither pattern to compensate for the deviations, it is also foreseen that the deviations of thickness are compensated by applying less ink locally when printing the layer 2, thus reducing the thickness of the layer 2 locally. The printed volumes follow a volume pattern, which is a two-dimensional template that contains information about the volume of printing ink that is to be placed depending on the position.

Printing the layer 2, further deviations, i. e. deviations of a further thickness from a further nominal thickness of a further layer 3 printed in a preceding printing step, are compensated. The further deviations arise from droplet volume variations or droplet misplacements while printing the further layer 3 and cannot be simulated or calculated accurately. Hence, the further deviations are determined by confocal scanning of a surface of the further layer 3 and compensated by leaving further blank spaces following a further dither pattern during printing the layer 2 and/or locally reducing the droplet volume following a further volume pattern during printing the layer 2.

It is possible to compensate for deviations and further deviations during each printing step, as well as to compensate for deviations and further deviations only during a part of the printing steps. In particular, it is advantageous to compensate for the deviations and/or further deviations during the printing of the last and outermost, i.e. the curved layers and to compensate for the deviations and/or further deviations of the layers printed in the previous printing steps. Therefore, the sum of the deviations and/or further deviations can be determined to that point, where compensating starts.

Figure 2:
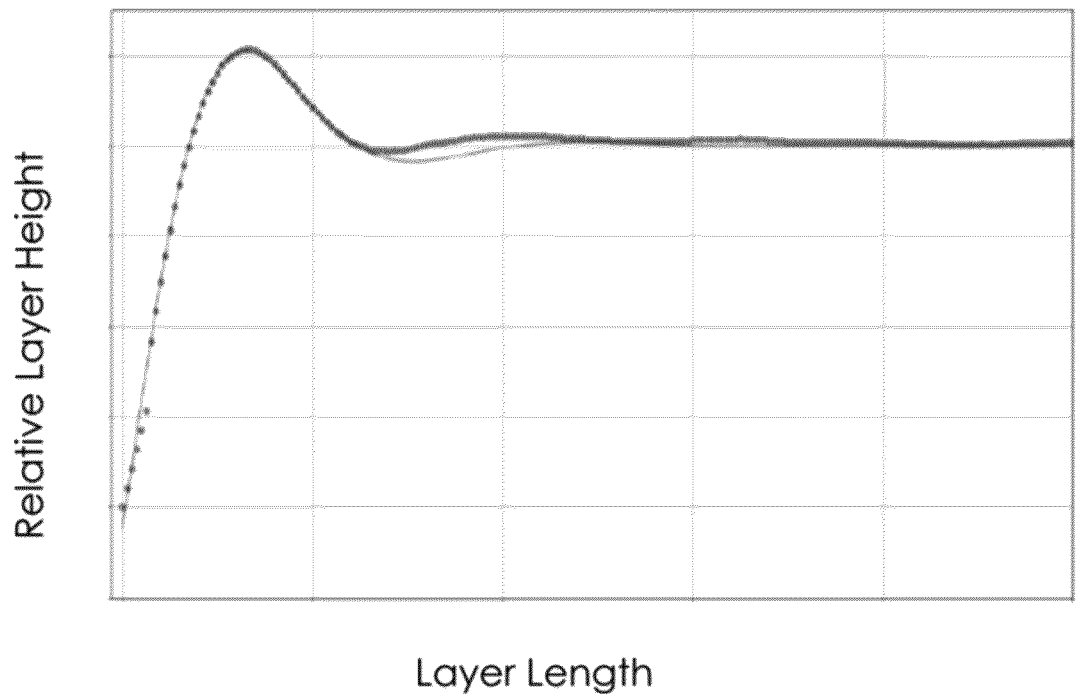
FIG. 2 schematically illustrates a plot of the relative layer height over the layer length.

In FIG. 2, a plot of the relative layer height, i. e. the layer thickness, over the layer length is schematically illustrated. The shown layer height is not compensated for deviations. At the edge of the layer, a clear excess of height is recognizable. This excess is caused by a contraction of the printing ink of the layer at the edges of the layer, which is caused by surface effects, such as surface tension, of the printing ink. As the diameter of the layer decreases, the excesses at the edges move closer together until they merge with each other at diameters of less than about 5 mm and become an excess of the entire layer.

Figure 3:
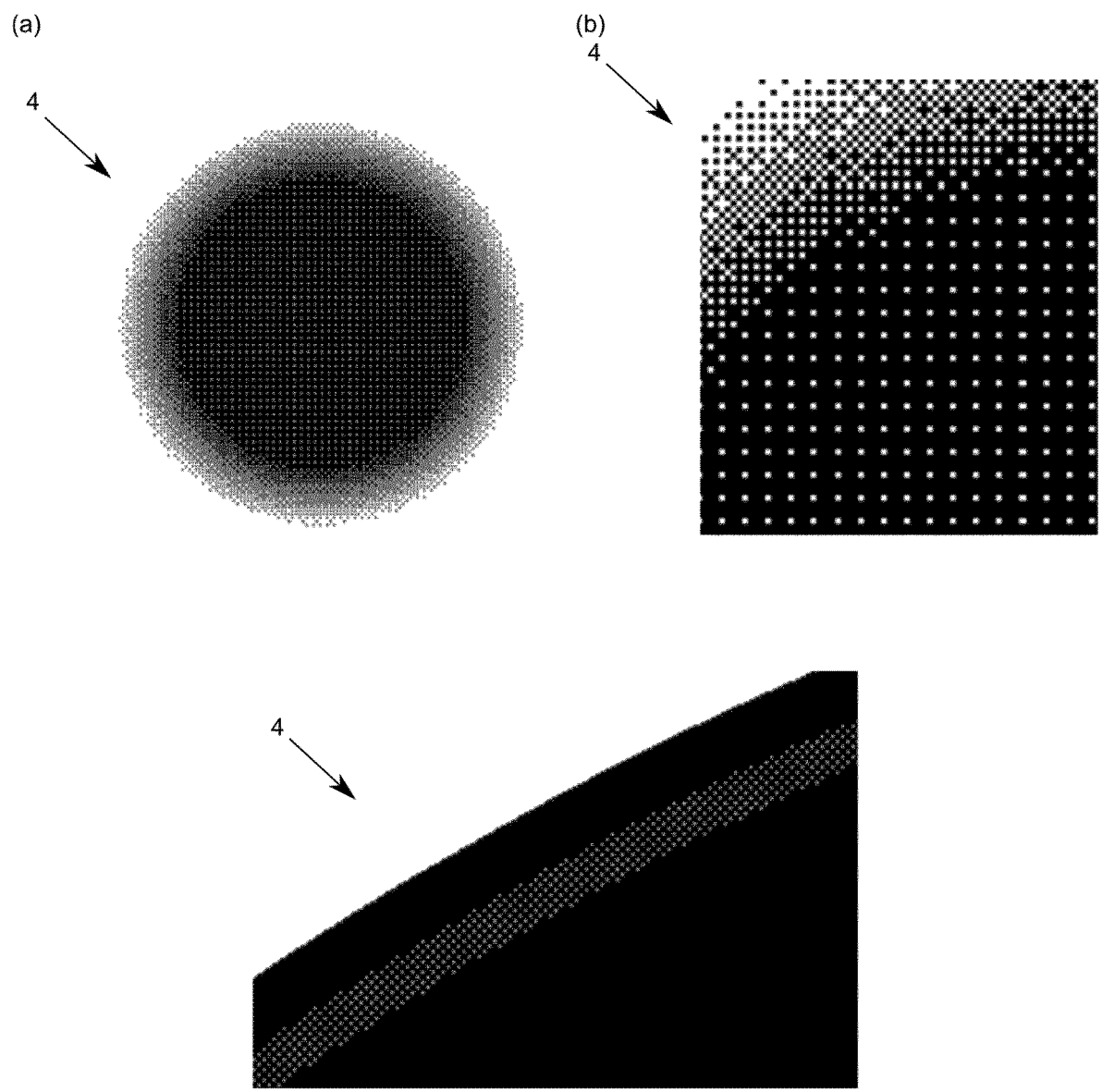
FIG. 3 schematically illustrates dither patterns used in a printing method according to an exemplary embodiment of the present invention.

In FIG. 3, dither patterns 4 used in a printing method according to an exemplary embodiment of the present invention are schematically illustrated. SubFIG. 3(a) shows a dither pattern 4 for a round layer. The white spots mark positions where blank spaces, i. e. positions where no printing ink is to be placed, are provided. The distribution of blank spaces in inhomogeneous. More blank spaces are provided at the edges of the layer than in the center, which results in slightly rising flanks of the layer. SubFIG. 3(b) shows a detail of subFIG. 3(a). The progression of the distribution of blank spaces from more at the edge of the layer to less at the center of the layer can be clearly seen. The blank spaces are not evenly spaced. The positions of the blank spaces are rather shifted by hardly recognizable random offsets against each other. This prevents unwanted optical grid effects. SubFIG. 3(c) shows a detail of a dither pattern 4. To compensate for an excess of thickness resulting from a contraction of the layer at the edges, the dither pattern 4 provides blank spaces arranged in a strip parallel to the circumference of the layer. The strip corresponds to the part of the layer described above and in the claims. The strip is provided as a closed ring with a width of approximately 0.5 mm and a distance of approximately 0.5 mm from the circumference.

KEY TO FIGURES

1 Optical structure
2 Layer
3 Further layer
4 Dither pattern
d Diameter
L Layers

The invention claimed is:

1. A method for printing a three-dimensional optical structure comprising:
   building the three-dimensional optical structure from layers of printing ink deposited through targeted placement of droplets of printing ink at least partially side by side in consecutive printing steps,;
   at least partially compensating for deviations of a thickness from a nominal thickness of at least one layer by determining possible deviations prior to printing the layer, wherein depositing the printing ink is controlled dependent on the determined possible deviations during printing of said layer;
   wherein during printing the layer, at least on a part of the layer, the droplets are placed according to a dither pattern, such that a number of droplets placed on the part is reduced;
   wherein the number of droplets is reduced by leaving blank spaces when placing the droplets, wherein no droplets are placed on said blank spaces;
   wherein the part of the layer is arranged parallel to a circumference of the layer;
   wherein the part of the layer is formed as a loop or ring;
   wherein the part of the layer is arranged a distance away from the circumference, or wherein the part of the layer adjoins the circumference.

2. The method according to claim 1, wherein the blank spaces are distributed over the entire layer if a diameter of the layer is below a minimum diameter.

3. The method according to claim 1, wherein the loop or the ring has a width, wherein the width is between 0.1 and 5 mm.

4. The method according to claim 1, wherein the blank spaces are arranged randomized or at least partially randomized on the part of the layer.

5. The method according to claim 1, wherein during printing the layer, at least on a further part of the layer, the volume of each droplet is reduced.

6. The method according to claim 5, wherein the further part of the layer covers the entire layer if a diameter of the layer is below a further minimum diameter.

7. The method according to claim 5, wherein the further part of the layer is arranged parallel to a circumference of the layer, wherein the further part of the layer is arranged a further distance away from the circumference, wherein the further distance is between 0.1 and 2 mm, or wherein the part of the layer adjoins the circumference.

8. The method according to claim 7, wherein the further part of the layer is formed as a loop or ring, wherein the loop or the ring has a further width, wherein the further width is between 0.1 and 5 mm.

9. The method according to claim 1, wherein in order to at least partially compensate for further deviations of a further thickness from a further nominal thickness of a further layer printed in a preceding printing step, depositing the printing ink is controlled dependent on the further deviations during printing of the layer.

10. The method according to claim 9, wherein the further blank spaces are arranged randomized or at least partially randomized on the second further part of the layer.

11. The method according to claim 9, wherein during printing the layer, at least on a third further part of the layer, the volume of each droplet is reduced.

12. The method according to claim 11 wherein the further deviations are determined by measuring the shape and/or volume of a surface of the further layer by confocal scanning.

13. The method according to claim 9 wherein the further deviations comprise deviations of thicknesses from further nominal thicknesses of all layers printed in preceding printing steps.

14. The method according to claim 1, wherein the deviations are determined by simulating a contraction of the printed layers.

15. The method according claim 14, wherein the deviations of all layers to be printed are determined before printing using a simulation, wherein the deviations are compensated during printing one or more layers.

16. The method according to claim 1, wherein the distance away from the circumference is between about 0.1 and about 2 mm.

17. The method according to claim 2, wherein the minimum diameter is about 5 mm.

18. The method according to claim 6, wherein the further minimum diameter is about 5 mm.

19. The method according to claim 9, wherein the deviations and/or the further deviations are determined by simulating a contraction of the printed layers.

20. The method according to claim 19, wherein the deviations and/or the further deviations of all layers to be printed are determined before printing using a simulation, wherein the deviations and/or further deviations are compensated during printing one or more layers.

* * * * *